F. R. G. RAYNAUD.
ARRANGEMENT FOR THE INSTANTANEOUS REPAIRS OF SUSPENSION SPRINGS OF VEHICLES.
APPLICATION FILED APR. 30, 1921.

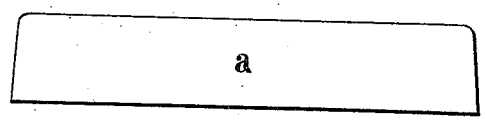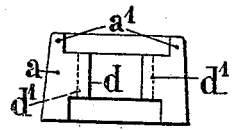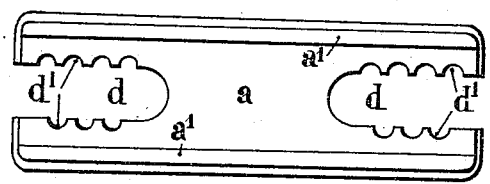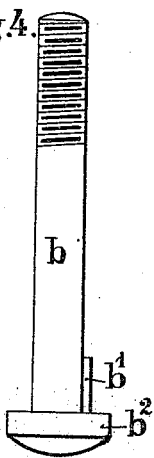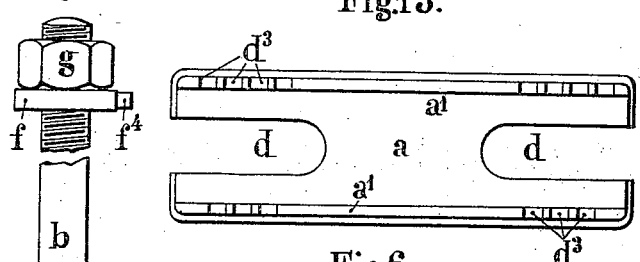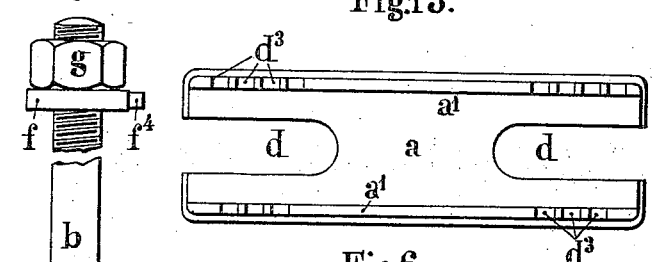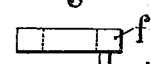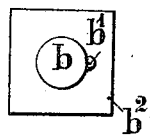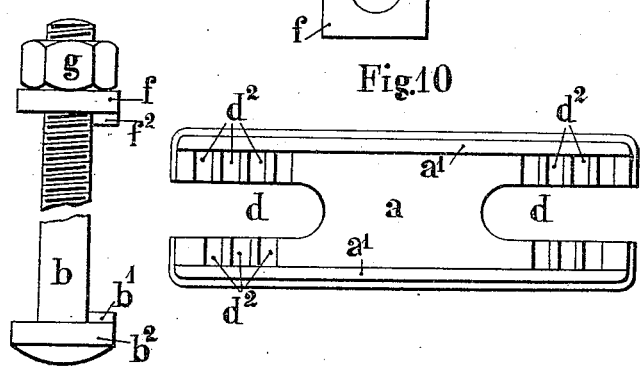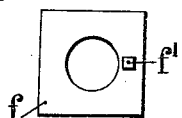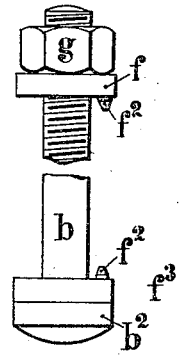

1,421,307.

Patented June 27, 1922.

INVENTOR
FERNAND R. G. RAYNAUD
BY Munn & Co.
ATTORNEYS

UNITED STATES PATENT OFFICE.

FERNAND RAPHAEL GASTON RAYNAUD, OF PARIS, FRANCE, ASSIGNOR TO SOCIETE ANONYME DES ETABLISSEMENTS RAYNAUD & BOURCERET, OF PARIS, FRANCE.

ARRANGEMENT FOR THE INSTANTANEOUS REPAIRS OF SUSPENSION SPRINGS OF VEHICLES.

1,421,307. Specification of Letters Patent. Patented June 27, 1922.

Application filed April 30, 1921. Serial No. 465,746.

*To all whom it may concern:*

Be it known that I, FERNAND RAPHAEL GASTON RAYNAUD, of 14 Rue Piccini, Paris, France, engineer, have invented an Arrangement for the Instantaneous Repairs of Suspension Springs of Vehicles, of which the following is a full, clear, and exact description.

Repairing devices for vehicle springs employed up to now consist of bridges or coupling plates joined together two by two by tightening bolts and arranged at various points on the broken part of the spring; one bridge or coupling plate of each pair is placed on the upper leaf of the spring and the other bridge or coupling plate on the under leaf, after placing metallic plates, so as to clamp between the said metallic plates the whole of the leaves constituting the spring and to consolidate this latter at the place where one of the leaves is fractured.

In known arrangements, the clamping bolts are introduced into a hole made at each end of the bridges or coupling plates, so that the distance separating the two bolts joining the bridges or coupling plates of the same pair is always the same, and that a repair device of the known kind of a given length can only be applied to a single spring of determined width corresponding to the distance between the two bolts.

The present invention has for its object to remedy this inconvenience and has for its object an arrangement permitting of effecting an immediate repair to suspension springs of vehicles, broken at any point of their length, and which can be applied to all springs whatever may be the width of the leaves constituting said spring and the thickness of this latter.

The repairing apparatus of the present invention is essentially characterized by this fact that the bridges or coupling plates present at each of their extremities a longitudinal split or slot of suitable length adapted to receive each clamping bolt and allowing these latter to be arranged at any regulable distance apart according to the width of the spring to be repaired; the said bridges or coupling plates present in addition recesses in which engage projections carried by the bolts and the washer on which presses their tightening nut so as to prevent any accidental loss of the said bolts.

In order to understand the invention there will be described below by the aid of the accompanying drawing by way of example only, various forms of carrying the repairing apparatus into effect made according to the present invention.

Figs. 1 to 3 are respectively a front elevation, a plan view and an end view of a first form of constructing the bridge or coupling plate.

Figs. 4 and 5 represent in elevation and in plan the bolt for connecting the bridges or coupling plates of the form represented in Figs. 1 to 3.

Figs. 6 and 7 are a front elevation and a plan of the washer of the above bolt.

Fig. 10 is a plan view of a modification of a bridge or coupling plate.

Figs. 11 and 12 show in front elevation one or the other of the bolts capable of being employed with the bridge or coupling plate shown in Fig. 10.

Fig. 13 is a plan view of another form of bridge or coupling plate.

Fig. 14 shows the bolt employed with said bridge or coupling plate.

The repairing device forming the subject of the present invention is composed of four bridges or coupling plates *a* and four bolts *b* intended to secure, as hereinafter explained, the clamping of the leaves of a broken spring *c* between the said bridges or coupling plates previously arranged in pairs on one and the other side of the fracture; one of the bridges or coupling plates of each pair on the principal upper leaf, the other bridge or coupling plate under the lower leaf of the said spring.

Figure 17:
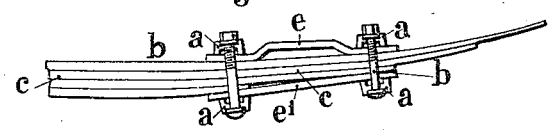
Fig. 17 is a front elevation showing the repairing device applied to a spring broken at one of its ends.

Each of the bridges or coupling plates is formed of a metal bar or block *a* presenting at each of its extremities a longitudinal split or slot $d$ in each of which is engaged a tightening bolt $b$ adapted to unite the bridges or coupling plates two by two arranged as above indicated, one on the upper leaf of the spring $c$, the other, below the lower leaf of the said spring, after interposing metal plates $e$ between the said outside leaves of the spring and one or both series of bridges or coupling plates $a$ according to whether the spring to be repaired is broken in the middle of its length, as is supposed in Fig. 15 or at one of its ends as shown in Fig. 17.

In the method of carrying the invention into effect shown in Figs. 1 to 9 the longitudinal slots $d$ made at each of the ends of the bridges or coupling plates $a$ to receive the tightening bolts $b$ are formed on their vertical edges with grooves $d^1$.

The grooves $d^1$ of the two bridges or coupling plates $a$ arranged each transversely under the lower leaf of the spring to be repaired and on one and the other side of the break $c^1$ of this latter, are adapted to receive a longitudinal key $b^1$ formed on the bolt $b$ (Figs. 4 and 5).

The grooves $d^1$ of each of the two bridges or coupling plates $a$ arranged on the upper leaf of the spring $c$ to be repaired, on the opposite side to the lower bridge or coupling plates are adapted to receive a little tongue $f^1$ formed on the washer $f$ on the upper face of which is exerted the action of tightening up the nut $g$ screwed on to the bolt $b$.

Figure 8:
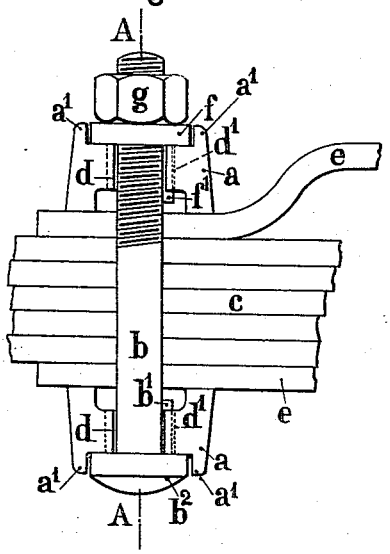
Fig. 8 is a partial elevation of a spring showing the method of mounting a pair of bridges or coupling plates one of which is shown in detail in Figs. 1 to 3.
Figure 9:
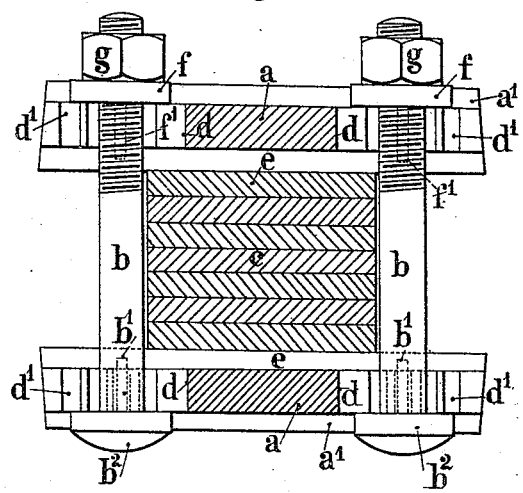
Fig. 9 is a vertical transverse section on the line A—A of Fig. 8.

The lower head $b^2$ of this bolt as well as the washer $f$ are, preferably, of square form as seen in Figs. 4 to 7, so as to fit in between the longitudinal ribs $a^1$ of each of the bridges or coupling plates $a$ (Figs. 8 and 9).

The washer $f$ may, moreover, be smooth, that is to say be formed without the little tongue $f^1$ above referred to.

The grooves or hollow parts $d^1$ made on the opposite faces of each of the longitudinal splits or slots $d$ are not made opposite each other, so as to permit of adjustment as exactly as possible of the distance apart of the bolts $b$ to the width of the leaves comprising the spring and consequently allowing the employment of the repairing device, the subject of the present invention, with springs of any and variable width.

In the example shown in Figs. 10 to 12 each bridge or coupling plate $a$ has upon its bearing face receiving the head $b^2$ of the bolt or the washer $f$, transverse grooves $d^2$ of any suitable section, adapted to receive for one of the series of bridges or coupling plates, a projection $b^1$ on the upper face of the head of the bolt and for the other series of bridges or coupling plates, a projection $f^2$ on the lower face of the washer $f$ as shown in Fig. 11.

The grooves $d^2$ may equally receive projections $f^2$ of any convenient profile formed on one of the faces of two opposed washers $f$ and $f^3$ adapted respectively to press upon the lower bridge or coupling plate and upon the upper bridge or coupling plate of the repairing device.

In the method of carrying the invention into effect shown in Figs. 13 and 14, the grooves or recesses $d^3$ are hollowed out of longitudinal ribs $a^1$ of each of the bridges or coupling plates $a$ and serve as housings for projections $b^3$ $f^4$ formed respectively upon one of the lateral faces of the head $b^2$ of the bolts and of the washers $f$.

In these two forms of carrying the invention into effect, the grooves $d^2$ and $d^3$ are not arranged in front of one another, so as to permit the repairing device being used, as above indicated, for all widths of springs.

Figure 15:
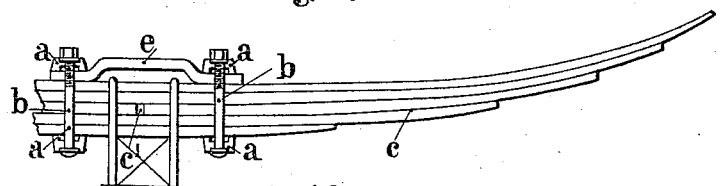
Figs. 15 and 16 are respectively a front elevation and a plan showing the repairing device applied to a spring one leaf of which is broken above the axle.
Figure 16:
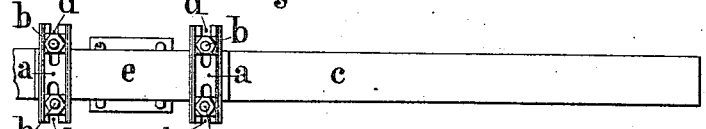

The repairing device forming the subject of the present invention is used in the following manner:

If the repairing device is intended to be employed for the consolidation of a spring broken at the centre of its length, above the axle for example, as shown in Figs. 15 and 16, one metal plate $e$, conveniently raised at its centre, so as to be capable of passing over the usual staples for fixing the spring upon the axle, is first placed upon the principal upper leaf of the spring. The two upper bridges or coupling plates of one or the other type described with respect to Figs. 1 to 9 and 10 to 14 are then arranged transversely to the spring upon the ends of the metal leaf $e$ and on one and the other side of the fracture $c^1$ as shown in Figs. 15 and 16.

These bridges or coupling plates are connected to two other similar bridges or coupling plates but turned upside down and placed under the lower leaf of the spring, by means of any one of the bolts $b$ above described; these bolts being introduced into the longitudinal slots $d$, in which they are maintained at a distance apart corresponding to the width of the spring to be repaired by the engagement of the projections of the said bolts and of their washers in the grooves, formed to receive them, either in the grooves or upon the bridges or coupling plates themselves.

The application of the repairing device is effected very rapidly and the consolidation of the spring is obtained in a perfect manner by screwing up hard the nuts on the bolts uniting the bridges or coupling plates as above described.

The longitudinal slots of each of these bridges or coupling plates permit in effect, the easy placing in position of the bolts which may be arranged near the vertical edges of the spring to be repaired whatever may be the width of this latter; the said bolts being moreover held against all accidental falling out by the engagement of the projection which they carry and of that of the washers on the grooves, notches or openings made in each bridge or coupling plate to receive them as has been explained.

When the repairing apparatus is to be applied to a spring broken at its ends, the method of application only differs from that described with regard to Figs. 15 and 16 in the fact that a metallic plate $e^1$ is added which is interpolated between the lower leaf of the broken spring and the lower bridges or coupling plates (Fig. 17).

The advantages of the repairing device above described are therefore as follows:—

It is applicable to all widths and thicknesses of existing springs, and prevents all accidental losses of the tightening bolts.

The constructive arrangements described are only given let it be understood, by way of an example; the shapes, materials and dimensions of the various constitutive parts being capable of modification without changing the invention.

Claims:

1. A repairing device for vehicle suspension springs comprising two pairs of bridges or coupling plates, each formed with a longitudinal slot at each end, a bolt engaged in each slot and connecting the bridges or coupling plates two by two, a polygonal washer on the said bolt, a tightening nut screwed on the said bolt, means for adjusting the position of the said bolts according to the width of the spring, and means for preventing the unloosening and the accidental loss of the said bolts.

2. A repairing device for vehicle suspension springs comprising two pairs of bridges or coupling plates, each formed with a longitudinal slot cut out in the web thereof and open at one of its ends, a bolt engaged in each slot and connecting the bridges or coupling plates two by two, a polygonal washer on the said bolt, a tightening nut screwed on the said bolt, means for adjusting the position of these bolts according to the width of the spring, and means for preventing the unloosening and the accidental loss of the said bolts.

3. A repairing device for vehicle suspension springs comprising two pairs of bridges or coupling plates, each formed with a longitudinal slot cut out in the web thereof and open at one of its ends, and with vertical grooves in the opposite edges of each slot, a bolt engaged in each slot and connecting the bridges or coupling plates two by two, a projection on each bolt, engaged in one of the vertical grooves of one of the bridges or coupling plates of each pair, a polygonal washer on the said bolt, fitted in between the longitudinal ribs of the second bridge or coupling plate, a projection of the said washer engaged in one of the vertical grooves of the said bridge or coupling plate, and a tightening nut screwed on the said bolt.

4. A repairing device for vehicle suspension springs comprising two pairs of bridges or coupling plates, each formed with a longitudinal slot cut out in the web thereof and open at one end if its ends, and with grooves on each side of the said slot formed in the web of each coupling plate, a bolt in each slot and connecting the coupling plates two by two, a projection on each bolt, engaged in one of the grooves of one of the coupling plates of each pair, a polygonal washer on the said bolt, fitted in between the longitudinal ribs of the other coupling plate of each pair, a projection of the said washer engaged in one of the grooves of the said coupling plate, and a tightening nut screwed on the said bolt.

5. A repairing device for vehicle suspension springs comprising two pairs of bridges or coupling plates, each formed with a longitudinal slot at the end of each coupling plate, and with grooves on each side of the slot, the grooves on one side of the slot being out of register with the grooves on the other side, a bolt in each slot and connecting the coupling plates two by two and provided with a projection, engaged in one of the said grooves of one of the coupling plates of each pair, a polygonal washer on the said bolt, fitted in between the longitudinal ribs of the second coupling plate, and provided with a projection engaged in one of the grooves of the second coupling plate, and a tightening nut screwed on the said bolt.

The foregoing specification of my arrangement for the instantaneous repairs of suspension springs of vehicles signed by me this 14th day of April, 1921.

FERNAND RAPHAEL GASTON RAYNAUD.